No. 767,044. PATENTED AUG. 9, 1904.
B. VOM EIGEN.
BAG FASTENER.
APPLICATION FILED DEC. 24, 1903.
NO MODEL. 3 SHEETS—SHEET 1.
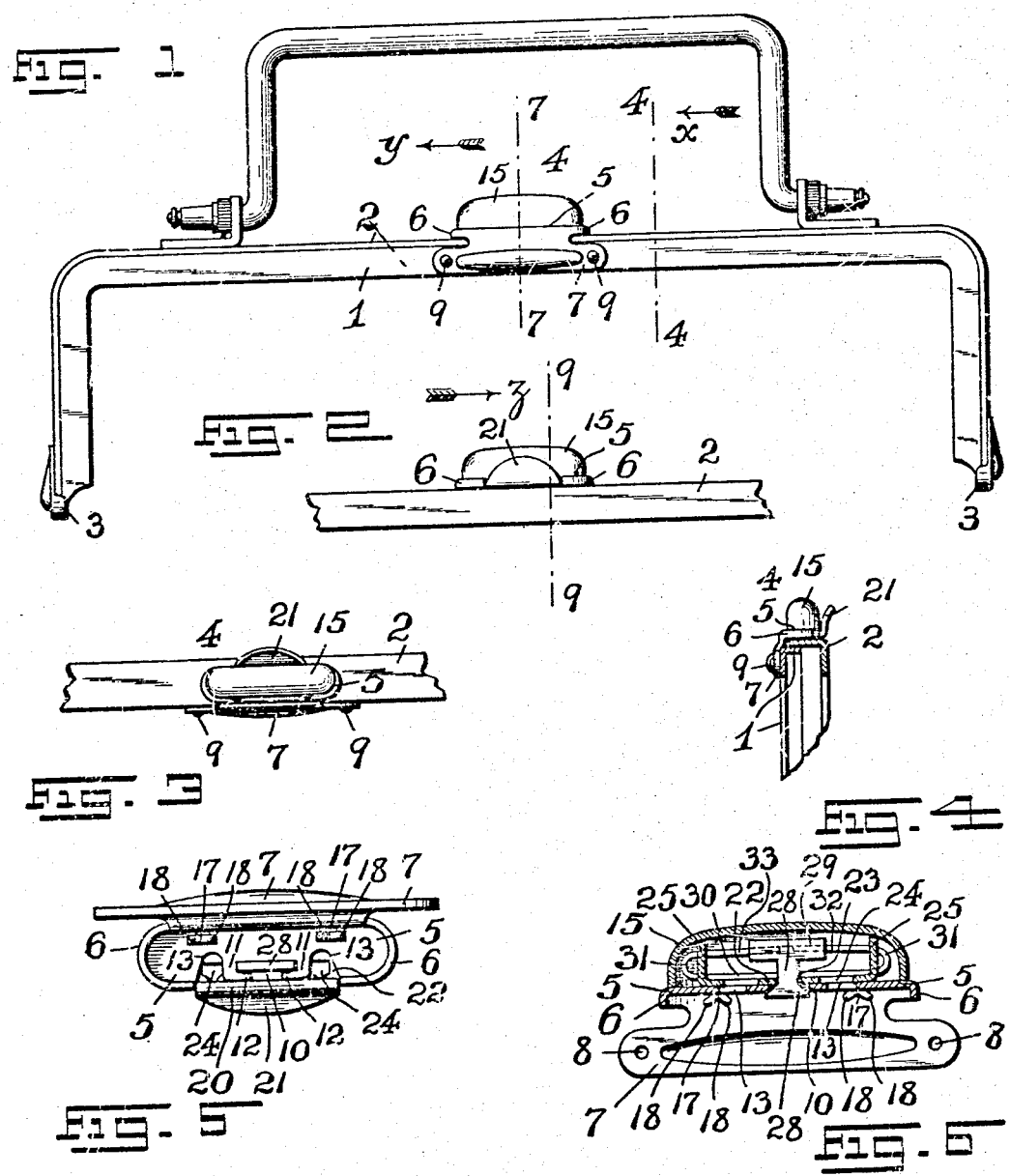
WITNESSES:
Geo. D. Richards
N. B. Fraentzel
INVENTOR:
Benno vom Eigen,
BY Fred C. Fraentzel,
ATTORNEY No. 767,044. PATENTED AUG. 9, 1904.
B. VOM EIGEN.
BAG FASTENER.
APPLICATION FILED DEC. 24, 1903.
NO MODEL. 3 SHEETS—SHEET 2.
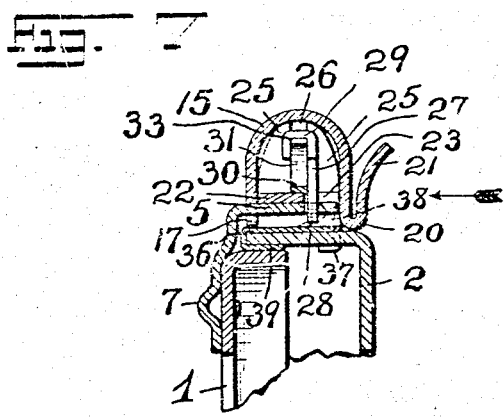
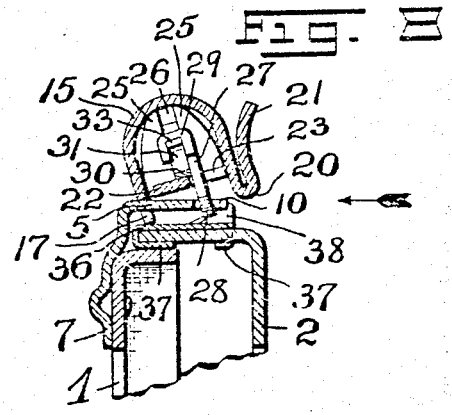
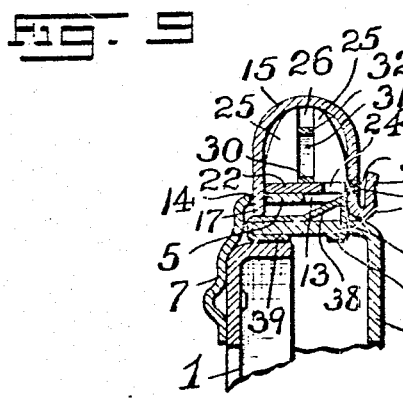
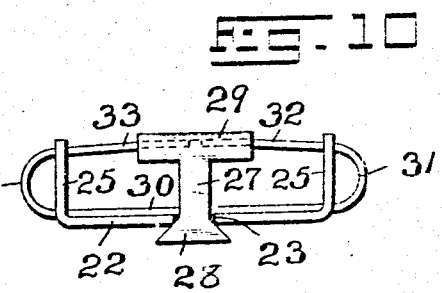
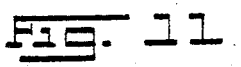
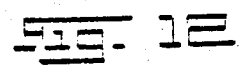
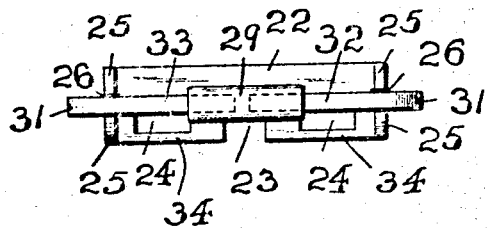
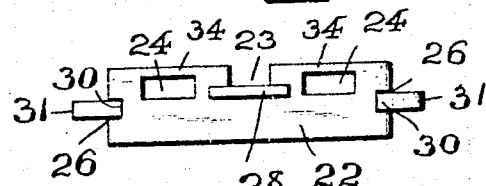
WITNESSES: INVENTOR:
Geo. D. Richards Benno vom Eigen,
N. B. Fraentzel BY Fred C. Fraentzel,
ATTORNEY No. 767,044. PATENTED AUG. 9, 1904.
B. VOM EIGEN.
BAG FASTENER.
APPLICATION FILED DEC. 24, 1903.
NO MODEL. 3 SHEETS—SHEET 3.
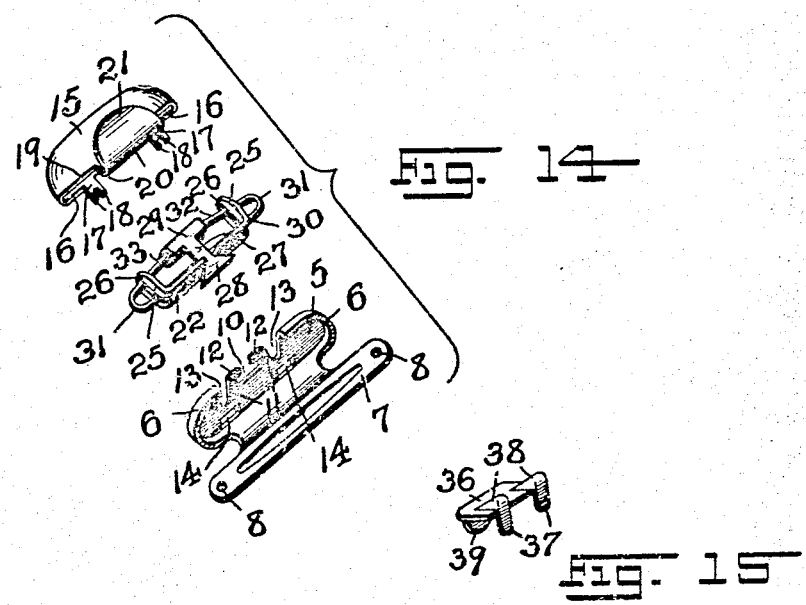
Fig. 14
Fig. 15
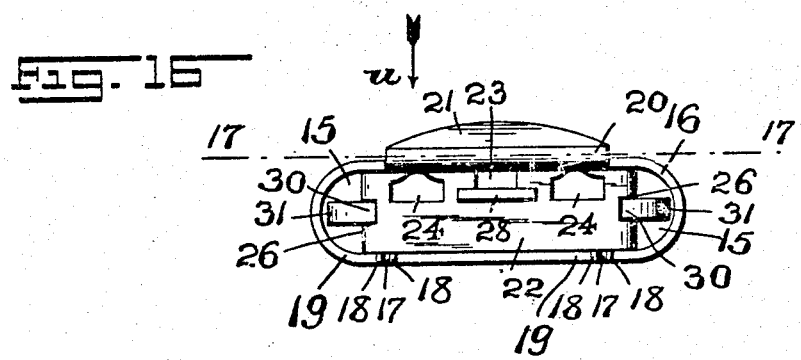
Fig. 16
Fig. 17
Fig. 18
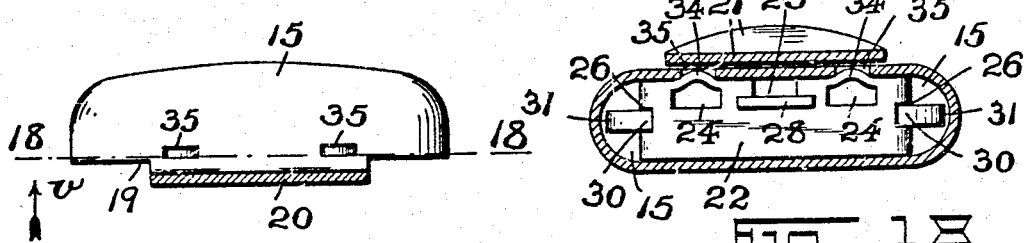
Fig. 19
WITNESSES:
Geo. D. Richard
N. B. Fraentzel
INVENTOR:
Benno vom Eigen,
BY Fred H. Fraentzel,
ATTORNEY No. 767,044.

Patented August 9, 1904.

UNITED STATES PATENT OFFICE.

BENNO VOM EIGEN, OF NEWARK, NEW JERSEY, ASSIGNOR TO AUG. GOERTZ & CO., OF NEWARK, NEW JERSEY, A FIRM.

BAG-FASTENER.

SPECIFICATION forming part of Letters Patent No. 767,044, dated August 9, 1904.

Application filed December 24, 1903. Serial No. 136,470. (No model.)

*To all whom it may concern:*

Be it known that I, BENNO VOM EIGEN, a citizen of the United States, residing at Newark, in the county of Essex and State of New Jersey, have invented certain new and useful Improvements in Bag-Fasteners; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates to improvements in that class of bag-fasteners which are used with the hinged frame-sections of satchels, purses, chatelaine and other bags; and the invention has for its principal object to provide a simply and neatly constructed bag-fastener of the character hereinafter more particularly specified.

The invention has for its further object to provide a bag-lock or holding-catch which shall be of a strong and durable construction and the parts of which can be readily assembled and retained in their operative positions; furthermore, to provide a bag-fastener which can be easily secured in position upon the bag-frame section, which securely retains the frame-sections of the bag, satchel, or purse or the like in their closed relation to each other, and which is easily manipulated when it is desired to open or separate the bag-frame sections.

Other objects of this invention not at this time enumerated will be evident from the following detailed description of my invention.

The invention consists, primarily, in the novel construction of bag-frame fastener hereinafter set forth; and, furthermore, this invention consists in the various arrangements and combinations of the devices and parts, as well as in the details of the construction of the same, all of which will be hereinafter more fully described and then embodied in the clauses of the claim, which are appended to and form an essential part of this specification.

The invention is clearly illustrated in the accompanying drawings, in which—

Figure 1 is a side elevation of one form of bag-frame and a front view of a lock or holding-catch secured thereto and embodying the principles of my present invention. Fig. 2 is a face view of a portion of one of the bag-frame sections and a view of the opposite side of the said lock or holding-catch. Fig. 3 is a top or plan view of the same, and Fig. 4 is a vertical cross-section taken on line 4 4 in said Fig. 1 looking in the direction of the arrow *x*. Fig. 5 is a bottom view, on an enlarged scale, of the lock or holding-catch detached from the frame-section; and Fig. 6 is a longitudinal sectional representation of the lock or holding-catch. Fig. 7 is a transverse vertical section, on an enlarged scale, said section being taken on line 7 7 in Fig. 1 looking in the direction of the arrow *y*, said view representing the two frame-sections and the parts of the lock or holding-catch upon the one frame-section and a catch-plate or clasp upon the other frame-section in their closed relation; and Fig. 8 is a similar view of the same parts, but representing the hinged or pivoted lock-casing in its raised position to permit the separable relation of the bag-frame sections. Fig. 9 is a transverse vertical section taken on line 9 9 in Fig. 2 of the drawings looking in the direction of the arrow *z*. Fig. 10 is a side view of a spring-holder and spring employed with the lock or holding-catch. Fig. 11 is a top or plan view of the same. Fig. 12 is a bottom view, and Fig. 13 is an end view, of the said spring-holder. Fig. 14 is a collective perspective view of the supporting-plate and lock-casing with the said spring-holder and its spring arranged in their detached relation prior to being assembled in their completed form as a bag-lock or holding-catch. Fig. 15 is a perspective view of a catch-plate or clasp used with the said lock or holding-catch. Fig. 16 is a bottom view of the pivoted lock-casing detached from the supporting-plate with the spring-holder arranged within said casing, illustrating one manner of securing said spring-holder in said lock-casing. Fig. 17 is a vertical section taken on line 17 17 in said Fig. 16 looking in the direction of the arrow *u*. Fig. 18 is a horizontal section taken on line 18 18 in Fig. 17 looking in the direction of the arrow *v*; and Fig. 19 is a similar sectional representation of the lock-casing and said spring-holder arranged within said casing, but before it is permanently secured in place.

Similar characters of reference are employed in all of the said above-described views to indicate corresponding parts.

In the said drawings the reference characters 1 and 2 indicate a pair of bag-frame sections of any usual configuration and which are pivotally connected at their lower end portions 3 in any usual and well-known manner. The frame-sections represented in the drawings are those of the usual bag-frame construction; but it will be evident from the following description that the bag-lock of holding-catch embodying the principles of my present invention may be used with the usual purse, pocket-book, or chatelaine-bag frame or any other frame.

The bag-frame lock or holding-catch is indicated by the reference character 4, and it comprises a lower supporting plate or member 5, having a downwardly-extending marginal shoulder or rib 6, forming with the said plate 5 a chamber, as will be clearly seen from an inspection of the several figures of the drawings. The said chambered member or plate 5 is formed at one side with a downwardly-extending portion or side piece 7, adapted to be arranged against the side of the frame-section 1 and secured thereto with any suitable fastening means, preferably by means of pins or rivets 9, which are passed through perforations 8 in said side piece 7 and in the frame-section 1. This plate or member 5, as will be seen more especially from Fig. 14 of the drawings, is made with a T-shaped opening 10, formed by a pair of prongs or extensions 11, having the end portions 12 extending laterally in directions toward each other and with the slotted or cut-away parts 13, substantially as illustrated. At this point the marginal shoulder or rib 6 of the plate or member 5 is cut away, as shown and for the purposes to be hereinafter described. The said member or plate 5 is also provided with two other holes or openings 14 at or near the edge of the plate where the said side piece 7 is connected therewith. The other and upper member or lock-casing 15 is preferably of the configuration represented in the several figures of the drawings, and it is provided along one of its marginal edges, as 16, with a pair of downwardly-extending lugs 17, having the bifurcated ends forming teats 18, the said lugs 17 being inserted in the openings 14 of the supporting plate or member 5 and the teats 18 being slightly forced apart or separated, as indicated in Figs. 5 and 6 of the drawings, whereby the said upper member or casing 15 is attached in its pivotal relation directly upon the upper surface of the said supporting plate or member 5, the manner of securing the parts together being such that a free pivotal or hinged relation between the said casing 15 and the plate 5 is permitted. The said lock casing or member 15 is also provided upon its marginal edge 19 with a U-shaped portion 20, which terminates in an upwardly-extending finger-piece 21, substantially as illustrated. Prior to the operation of pivotally securing the said casing or member 15 upon the supporting plate or member 5 the spring-holder and its spring (indicated in the several figures of the drawings) is arranged within the chamber of the said casing or member 15, and a portion of said holder is attached to the plate or member 5 in the manner to be presently described. This spring-holder consists, essentially, of a body-plate 22, provided with a slot or opening 23, a pair of holes or openings 24, and at its ends the said plate 22 is provided with the angularly-extending arms 25, each arm 25 being provided with a slot 26, which forms a guide. Movably arranged in the opening or slot 23 of the body-plate 22 is a post 27, having an enlargement, as 28, arranged below and against the under surface of the plate 22 directly beneath the opening or slot 23, and the upper end of said post 27 being provided with a holding member 29, which is preferably bent ∩-shaped, as clearly illustrated. An elliptical or oblong spring comprising a main body 30, rounded portions 31, and the two end portions 32 and 33 is then connected with the spring-holder in such a manner that its body 30 will rest upon the upper surface of the body-plate 22, a rounded portion 31 of the spring being movably arranged in a slot 26 of each arm 25 and the free end portions 32 and 33 of the spring being sprung beneath the holding member 29 of the post 27. It will thus be clearly seen that while the spring may be compressed in the manner and for the purposes hereinafter set forth the slotted arms 25 form suitable guides for the proper action of the spring, the said arms 25 at the same time retaining the spring in its vertical and operative position and preventing the spring from falling over.

The several parts are now assembled by compressing the end portions 32 and 33 of the spring, thus moving the enlargement 28 of the post 27 sufficiently below the lower surface of the body-plate 22 that the said enlargement 28 can be passed into the T-shaped opening 10 of the supporting plate or member 5 and beneath the said plate or member 5, as indicated in Figs. 5 and 6, and the action of the spring causing the spring-holder to be connected to and practically united with the said plate or member 5. The locking casing or member 15 is now arranged over the said spring-holder and its spring, with the lugs 17 inserted in the openings or holes 14 of the supporting plate or member 5 and certain edge portions 34 at the openings or holes 24 of the body-plate 22 brought directly opposite correspondingly-located holes or openings 35 in the side of the lock casing or member 15, as clearly indicated in the sectional representation in Fig. 19 of the drawings. By means of a proper tool in one operation certain parts of the tool bend over or separate the teats 18 of the lugs 17 against the under surface of the supporting plate or member 5 to produce the pivotal relation of the lock-casing 15 with the upper surface of the supporting plate or member 5, as has been previously stated, while at the same time the edge portions 34 contiguous to the holes or openings 24 in the body-plate 22 are spread or forced into the holes or openings 35 of the said lock casing or member 15, as clearly indicated in Fig. 18 of the drawings, whereby the body-plate 22 of the said spring-holder is immovably fixed within the chamber of the casing or member 15, while the post 27 is held by the plate or member 5, the parts being retained in their normal initial positions by the action of the spring, as clearly indicated in Figs. 6, 7, and 9 of the drawings, but the spring being compressed when the lock casing or member 15 is brought into its raised pivotal relation with the plate or member 5 (indicated in Fig. 8) when pressure is applied against the finger-piece 21 in the direction of the arrow. (Indicated in said Figs. 7, 8, and 9.) When the pressure is removed from the said finger-piece 21, the several movable parts will all be returned to their normal initial positions by the action of the spring, as will be clearly understood.

A holding or locking clasp 36 is secured upon the frame-section 2 by means of a pair of prongs 37, which are passed through openings 40 in the frame-section and are bent over against the under side thereof, and a clamping-lip 39, which is clamped around the edge of the frame-section, as shown; but of course it will be evident that the said clasp may be secured in any other suitable manner upon the said frame-section 2. The said clasp 36 is also provided with one or more upwardly-extending holding members 38, as illustrated, upon which the U-shaped portion 20 of the lock casing or member 15 rides and drops behind the same when the two frame-sections are closed upon each other, but can be released from said portion 20 when the lock casing or member 15 is raised by means of the finger-piece 21 to permit the two frame-sections to be opened or separated.

The manipulation and operations of the several parts are clearly evident from the above description and from an inspection of the drawings and need not be further described.

It will be clearly evident that the construction of the lock or holding-catch is very simple, and there being but few parts such parts are easily and quickly assembled, and the parts cannot become disarranged by accident to render the device inoperative.

I am aware that changes may be made in the arrangements and combinations of the devices and their parts, as well as in the details of the construction thereof, without departing from the scope of the present invention. Hence I do not limit this invention to the exact arrangements and combinations of the devices and their parts as described in the foregoing specification and as illustrated in the accompanying drawings, nor do I confine myself to the exact details of the construction of the same.

Having thus described my invention, what I claim is—

1. A bag-fastener for a frame having hinged frame-sections, said fastener comprising an open-bottomed and chambered casing and means for securing said casing to one of said frame-sections, a finger-piece integrally united with the said casing and extending in a downward direction from a portion of the lower marginal edge of the said casing, said finger-piece having a lower curved marginal edge portion and being bent outwardly and upwardly in front of one of the sides of said casing, a spring, and a plate at the lower open portion of said casing having a downwardly-extending marginal rib forming with said plate a chamber, said rib being provided with a cut-away part in which the lower curved marginal edge portion of the finger-piece is normally arranged and is flush with the lower marginal edge of the rib of said plate, and a holding means at the juncture of said plate and said downwardly-extending part of the finger-piece for engagement with the other frame-section, substantially as and for the purposes set forth.

2. A bag-fastener for a frame having hinged frame-sections, said fastener comprising an open-bottomed and chambered casing and means with which the said casing is pivotally connected, said means being secured to the side of one of said frame-sections and having a downwardly-extending marginal rib forming a chambered portion extending over and above the upper face of said frame-section, said rib being provided with a cut-away part, a finger-piece integrally united with the said casing and extending in a downward direction from a portion of the lower marginal edge of the said casing, said finger-piece having a lower curved marginal edge portion and being bent outwardly and upwardly in front of one of the sides of said casing, the said lower curved marginal edge portion of said finger-piece normally being arranged in said cut-away part of said rib and being flush with the lower marginal edge of the rib, a spring, said chambered portion of the fastening means being arranged at the lower open portion of said casing, and a holding means at the juncture of said chambered portion of the fastening means and said downwardly-extending part of the finger-piece for engagement with the other frame-section, substantially as and for the purposes set forth.

3. The combination, with a holding device secured to a bag-frame section, of a side piece attached to another bag-frame section and having a plate at right angles thereto extending above and over the face of the bag-frame section, said plate having a downwardly-extending marginal rib provided with a cut-away part, a lock-casing secured on said plate, and a finger-piece extending from the lower marginal edge of said casing and having a lower curved marginal edge portion and extending upwardly in front of said casing directly in front of that portion of the casing with which said finger-piece is connected, said holding device on the other frame-section being adapted to be forced in slidable and lifting engagement with the lower edge of said finger-piece, and the lower marginal edge portion of said finger-piece resting normally in the cut-away part of said rib and being flush with the marginal edge of said rib, substantially as and for the purposes set forth.

4. A bag-fastener, comprising a lower chambered supporting-plate provided with an opening in the top, and having a downwardly-extending marginal rib forming with said plate a chamber, said rib being provided with a cut-away part, an upper member pivotally connected in the manner of a hinge to the one edge of said supporting-plate, a spring-holder in said upper member, a post connected with said spring-holder provided with an enlarged end arranged in the opening in said supporting-plate, an outwardly and upwardly extending finger-piece connected with the lower marginal edge of said upper member, said finger-piece having a lower curved marginal edge portion normally arranged in the cut-away part of said rib and being flush with the lower marginal edge of the rib, and means with which a clasp can be brought in holding engagement, substantially as and for the purposes set forth.

5. A bag-fastener, comprising a supporting-plate provided with an opening, an upper member pivotally connected in the manner of a hinge to said supporting-plate, a spring-holder in said upper member, consisting, essentially, of a body-plate having an opening corresponding to the opening in said supporting-plate, a pair of spring-retaining guides on said body-plate, and a spring held between said guides, a post, means on said post for attachment to a portion of said spring, said post extending through the openings in said body-plate and said supporting-plate, means at the opposite end of said post for attachment of said post to said supporting-plate, and means with which a clasp can be brought in holding engagement, substantially as and for the purposes set forth.

6. A bag-fastener, comprising a supporting-plate provided with an opening, an upper member pivotally connected in the manner of a hinge to said supporting-plate, a spring-holder in said upper member, consisting, essentially, of a body-plate having an opening corresponding to the opening in said supporting-plate, a pair of spring-retaining guides on said body-plate, and a spring held between said guides, a post, means on said post for attachment to a portion of said spring, said post extending through the openings in said body-plate and said supporting-plate, means at the opposite end of said post for attachment of said post to said supporting-plate, an outwardly and upwardly extending finger-piece connected with the lower marginal edge of said upper member, and means with which a clasp can be brought in holding engagement, substantially as and for the purposes set forth.

7. A bag-fastener, comprising a supporting-plate, an upper member pivotally connected in the manner of a hinge to said supporting-plate, a spring-holder in said upper member, consisting, essentially, of a body-plate, a pair of arms connected with said body-plate provided with slotted portions, an elliptical spring upon said body-plate, said spring having rounded portions movably arranged in the slotted portions of said arms, a means of connection between a portion of said spring and said supporting-plate, and means with which a clasp can be brought in holding engagement, substantially as and for the purposes set forth.

8. A bag-fastener, comprising a supporting-plate, an upper member pivotally connected in the manner of a hinge to said supporting-plate, a spring-holder in said upper member, consisting, essentially, of a body-plate, a pair of arms connected with said body-plate provided with slotted portions, an elliptical spring upon said body-plate, said spring having rounded portions movably arranged in the slotted portions of said arms, a means of connection between a portion of said spring and said supporting-plate, an outwardly and upwardly extending finger-piece connected with the lower marginal edge of said upper member, and means with which a clasp can be brought in holding engagement, substantially as and for the purposes set forth.

9. A bag-fastener, comprising a supporting-plate provided with an opening, an upper member pivotally connected in the manner of a hinge to said supporting-plate, of a body-plate having an opening corresponding to the opening in said supporting-plate, a pair of arms connected with said body-plate provided with slotted portions, an elliptical spring upon said body-plate, said spring having rounded portions movably arranged in the slotted portions of said arms, a post arranged in the openings of said body-plate and said supporting-plate, a bent and hook-shaped upper end portion on said post arranged over a portion of said spring, and an enlarged end portion on said post connected with said supporting-plate, and means with which a clasp can be brought in holding engagement, substantially as and for the purposes set forth.

10. A bag-fastener, comprising a supporting-plate provided with an opening, an upper member pivotally connected in the manner of a hinge to said supporting-plate, of a body-plate having an opening corresponding to the opening in said supporting-plate, a pair of arms connected with said body-plate provided with slotted portions, an elliptical spring upon said body-plate, said spring having rounded portions movably arranged in the slotted portions of said arms, a post arranged in the openings of said body-plate and said supporting-plate, a bent and hook-shaped upper end portion on said post arranged over a portion of said spring, and an enlarged end portion on said post connected with said supporting-plate, an outwardly and upwardly extending finger-piece connected with the lower marginal edge of said upper member, and means with which a clasp can be brought in holding engagement, substantially as and for the purposes set forth.

11. In a bag-fastener, the combination, with a lock-casing and means with which a clasp can be brought in holding engagement, of a spring-holder and an elliptical spring in said lock-casing, and guides connected with said spring-holder in which portions of said spring are slidably arranged for supporting said spring in a vertical position, substantially as and for the purposes set forth.

12. In a bag-fastener, the combination, with a lock-casing and means with which a clasp can be brought in holding engagement, of a spring-holder and an elliptical spring in said lock-casing, guides connected with said spring-holder in which portions of said spring are slidably arranged for supporting said spring in a vertical position, a post connected at one end with said spring, and a means of attachment at the other end of said post, substantially as and for the purposes set forth.

13. In a bag-fastener, the combination, with a pivoted lock-casing, of a spring-holder in said casing, comprising a body-plate, slotted guide-arms on said plate, an elliptical spring supported on said plate between said guide-arms, and means connected with said spring whereby the lifting movement of the lock-casing will compress said spring, and said spring will return said lock-casing to its normal initial position, substantially as and for the purposes set forth.

14. In a bag-fastener, a lock-casing having an opening, combined with a spring-holder, comprising a body-plate having an opening corresponding to the opening in said casing, and a marginal edge of the opening in said body-plate being arranged in the opening in said lock-casing, substantially as and for the purposes set forth.

15. In a bag-fastener, the combination, with a supporting-plate having openings, of a lock-casing having bifurcated lugs arranged in the openings of said supporting-plate and clenched over, whereby said lock-casing is pivoted upon said supporting-plate, said lock-casing being also provided with openings in its side, and a spring-holder, comprising a body-plate having openings corresponding to the openings in the side of said lock-casing, and a marginal edge of each opening in the body-plate being arranged in an opening in the side of the lock-casing, substantially as and for the purposes set forth.

In testimony that I claim the invention set forth above I have hereunto set my hand this 22d day of December, 1903.

BENNO VOM EIGEN.

Witnesses:
 FREDK. C. FRAENTZEL,
 GEO. D. RICHARDS.